June 16, 1959 C. S. GLENNY 2,890,819
DUAL CARRIER BASKETS FOR BICYCLES
Filed June 29, 1956 3 Sheets-Sheet 1
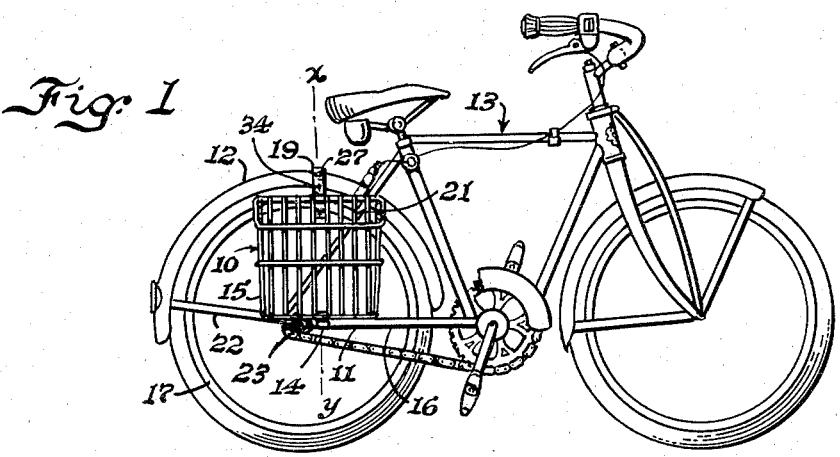
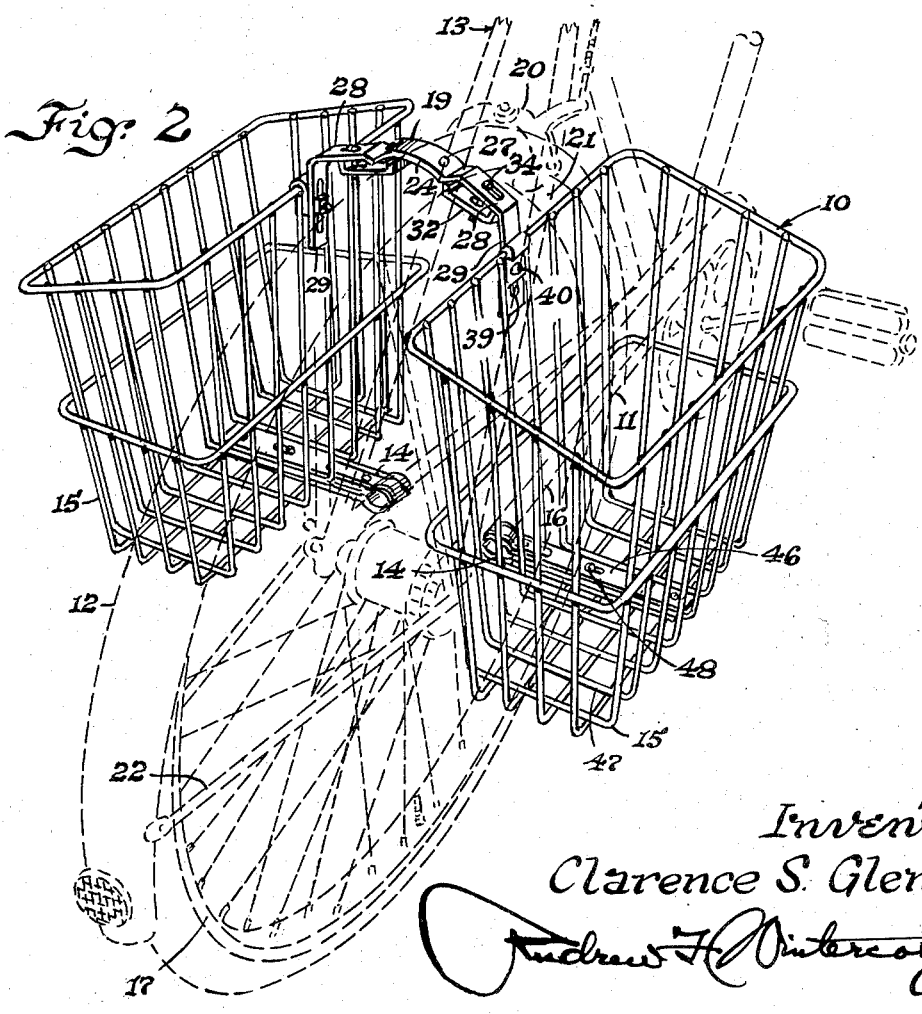
Inventor
Clarence S. Glenny June 16, 1959  C. S. GLENNY  2,890,819
DUAL CARRIER BASKETS FOR BICYCLES
Filed June 29, 1956  3 Sheets-Sheet 2

Inventor
Clarence S. Glenny

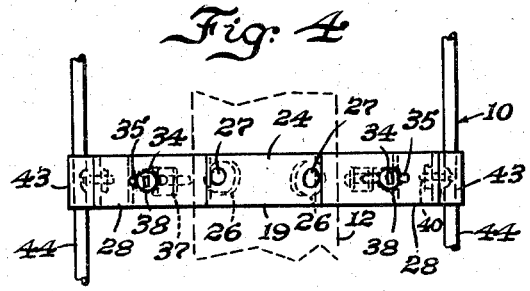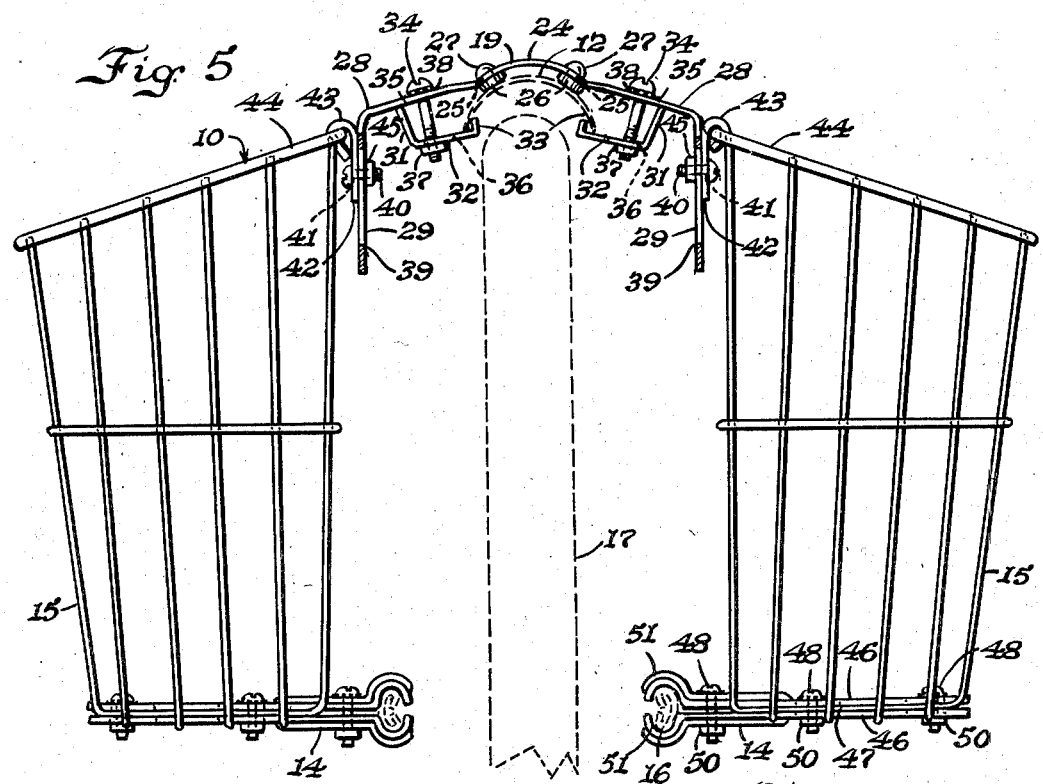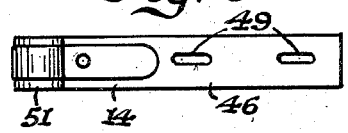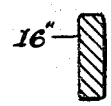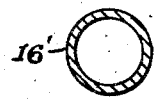

United States Patent Office 2,890,819
Patented June 16, 1959

2,890,819

DUAL CARRIER BASKETS FOR BICYCLES

Clarence S. Glenny, Rockford, Ill., assignor to The Washburn Company, Worcester, Mass., a corporation of Massachusetts Application June 29, 1956, Serial No. 594,902

16 Claims. (Cl. 224—32)

This invention relates to new and improved dual carrier baskets for application to the rear portions of bicycles on opposite sides of the rear wheel, the present ones relying for their support partly upon attachment to the frame and partly upon attachment to the rear fender.

The novel attaching means provided in accordance with my invention have been designed with a view to:

(1) Ease of assembly on a bicycle so that a person having little mechanical ability will not find it too difficult to apply the baskets to a bicycle satisfactorily;

(2) Adjustability and adaptability of the attachments to suit different makes and models of bicycles, the present attachments enabling mounting the baskets spaced outwardly from both sides of the frame far enough to leave ample operating clearance between the frame and baskets for projecting items of equipment provided on certain bicycles;

(3) Reasonably quick and easy detachability of the baskets from the bicycle without sacrificing rigidity and security of connection when attached, it being recognized that some youngsters who need these baskets for carrying newspapers prefer to have the baskets on the bicycle only while they are being used for that purpose, and (4) Minimum damage to the finish on the bicycle by reason of the fastening of the attachments to the frame and fender.

The invention is illustrated in the accompanying drawings, in which—

Fig. 1 is a side view of a bicycle equipped with dual carrier baskets in accordance with my invention;

Fig. 2 is a rear perspective view of the dual carrier baskets and their attaching means, the rear portion of the bicycle being illustrated in phantom to enable better illustration of the invention;

Fig. 4 is a top view of the fender-attached bracket;

Fig. 5 is a rear view of the whole assembly;

Fig. 6 is a plan view of a part of one of the two frame-attached brackets;

Figs. 7, 8 and 9 are illustrations of different frame cross-sections which the frame-attached brackets are designed to fit.

Similar reference numerals are applied to corresponding parts throughout the views.

Figure 3:
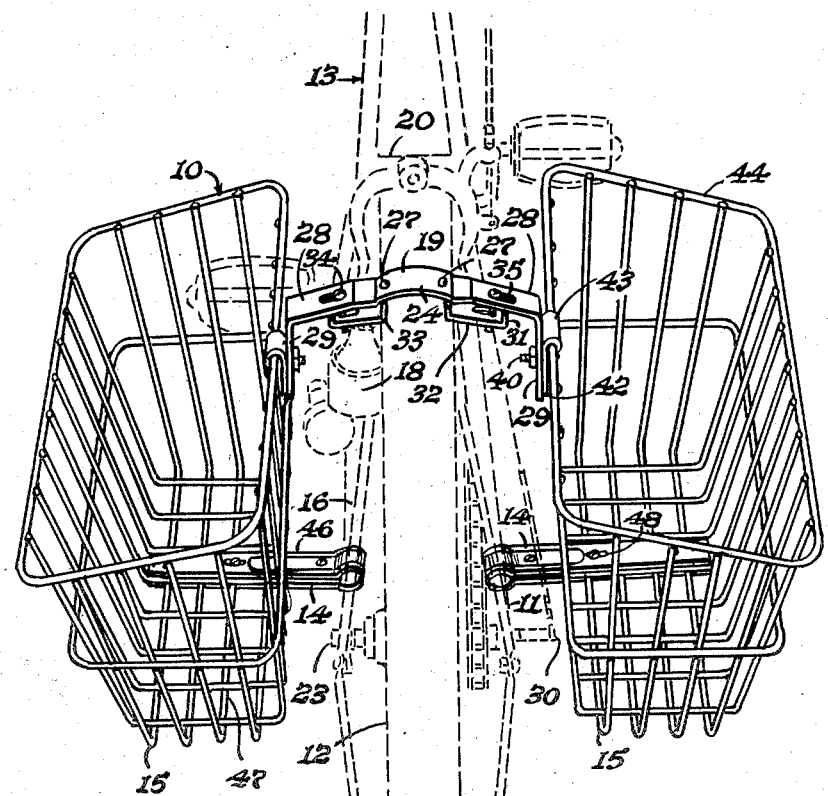
Fig. 3 is another rear perspective view of the dual carrier baskets with the bicycle again shown in phantom, this view serving to emphasize the wide spacing of the baskets with respect to the rear wheel to leave ample clearance for any projecting equipment, such as the wheel-driven generator indicated on the left-hand side.

Referring to the drawings, the reference numeral 10 designates the dual carrier baskets of my invention generally, shown applied to the rear portion of the frame 11 and rear fender 12 of a bicycle indicated generally by the reference numeral 13. Two frame-attaching brackets 14 are provided at the bottom of the assembly under the baskets 15 at the middle thereof for connection with the opposite sides of the lower rear fork portion 16 of the frame for support of the baskets in rigid relationship to the bicycle frame and parallel to the rear wheel 17 and spaced outwardly from both sides of the bicycle to the same appreciable extent, as best appears in Figs. 3 and 5, giving good balance for easier riding of the bicycle, and also providing ample clearance for any projecting equipment on the bicycle, such as the wheel-driven generator 18 shown in Fig. 3. The fender-attaching bracket 19, which is of generally inverted U-shape and straddles and has connection with the middle portion of the rear fender 12, serves by connection with the upper ends of the baskets 15 at the middle of their inner sides, to further support the baskets in rigid relationship to the bicycle frame, due to the fact that the point of connection of the bracket 19 with the fender 12 is so close to the point where the fender 12 is fastened to the cross-portion 20 of the upright rear fork portion 21 of the bicycle frame. The rear end of the fender 12 is, of course, also supported against sidewise displacement by means of the usual fork 22 that connects to the rear axle 23. The fender-attaching bracket 19, as best appears in Fig. 1, is disposed approximately in the same vertical plane $xy$ with the frame-attaching brackets 14 mentioned previously, this plane passing through the middle portion of the two baskets 15, so that the load of newspapers placed in each basket is distributed symmetrically with respect to brackets 14 and 19 supporting that basket and the basket, therefore, is not so apt to get bent out of shape. The loads in the two baskets are usually kept fairly evenly balanced to enable easier riding and steering, and so long as neither basket is too greatly over-loaded in relation to the companion basket, it should be evident that the side pull on the rear fender 12 will be fairly balanced and there will be no danger of the fender getting bent out of shape.

The fender-attaching bracket 19 has the middle portion 24 of the cross-portion of the U arched upwardly to conform to the arcuate cross-section of the fender 12, and there are holes 25 in the opposite ends of this arcuate portion 24 in which the reduced supporting shanks of rubber bumper pads 26 are received, these pads 26 having engagement with the fender 12 on the opposite sides of the crown portion thereof, as best illustrated in Fig. 5, for support of the bracket 19 on the fender without any metal to metal contact with the fender externally thereof, so that the finish on the fender will be protected. Slightly enlarged semispherical heads 27 are provided on the outer ends of the shanks of the pads 26 which can be compressed and forced through the holes 25 to prevent accidental displacement of the pads from the holes 25 while the assembly is not applied to the fender. The bracket 19 has the opposite end portions 28 of the cross-portion of the U elongated to the extent best shown in Figs. 3 and 5, so as to locate the downwardly projecting, substantially vertical, basket-attaching arms 29 far enough away from both sides of the fender 12 for ample clearance with respect to any projecting equipment on either side of the bicycle, like the generator 18 mentioned previously and any other items of equipment, such as the change-speed, flexible control cable running to one end of the rear axle, as indicated at 30 in Fig. 3. These outwardly reaching opposite end portions 28 also provide surfaces on their underside, as best appears in Fig. 5, for clamping abutment of the one upwardly reaching end 31 of the U-shaped sheet metal clips 32 provided for clamping the bracket 19 onto the fender 12 at the opposite side portions of the latter, the clips 32 having upwardly reaching inner end portions 33 for abutment with the underside of the fender, and the clips being arranged to be drawn upwardly into tight clamping engagement with the fender by means of bolts 34. These extend through slots 35 in the bracket 19 and through slots 36 in the cross-portion of the clips 32 and have nuts 37 threaded on their projecting lower end portions to permit tightening the clips 32 on the fender to the extent necessary to hold the fender-attaching bracket 19 in rigid relationship to the fender. Obviously, narrower fenders 12 will necessitate having the clips 32 adjusted closer together, while wider fenders will necessitate adjusting the clips 32 farther apart, and that is the reason for providing the slots 35 lengthwise of portions 28. The slots 36 in clips 32 extending lengthwise of the cross-portion thereof enable adjusting the individual clips in or out with respect to the lower end portions of bolts 34 so that they both overlap about the same width of the underside of the fender. Lock-washers are preferably provided under the heads of the bolts 34, as indicated at 38 in Figs. 4 and 5, to reduce likelihood of the bolts loosening after they have been properly tightened. The arms 29 have vertically extending slots 39 provided therein for adjustable reception of bolts 40 that are entered through holes 41 provided in brackets 42 that are disposed vertically alongside the arms 29 and are fastened by means of looped upper end portions 43 to the inner side-portions of the rectangular wire top frames 44 on the baskets 15. Nuts 45 are threaded on the projecting inner end portions of the bolts 40 and the bolts are arranged to be tightened to clamp the brackets 42 to the arms 29 in adjusted relationship thereto.

Figures 10, 11:
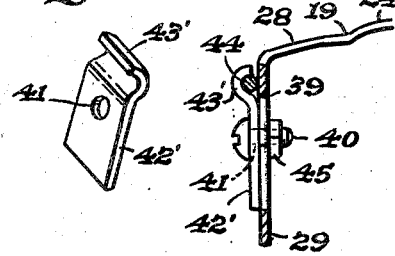
Figs. 10 and 11 are, respectively, a perspective view of a modified form of basket clamp bracket, and a sectional detail showing how it is used in adjustably securing the top of the basket to the side of the fender-attached bracket.

Referring to Figs. 10 and 11, I may use in lieu of brackets 42 permanently assembled on the basket top frames 44 at the middle thereof, brackets 42' having hook-shaped ends 43' adapted to be placed in clamping relation to top frame 44 wherever the user prefers or requires. Thus, if the rider finds that the baskets 15 are too far forward when set at the mid-location x—y shown in Fig. 1 and there is not enough foot room with respect to the lower front portions of the baskets for comfortable pedalling, he can set the brackets 14 and 42' farther forward on the baskets and thus dispose the baskets that much farther to the rear on the bicycle, assuming no change is made in the location of brackets 14 and 19 on the bicycle. It is generally not necessary to set the brackets 14 and 42' too far forward from the middle vertical plane x—y of the baskets to give rise to any danger of the baskets getting bent out of shape due to the uneven distribution of weight in the baskets relative to the vertical plane of the brackets.

The two frame-attaching brackets 14 are of identical construction, and hence, the description of one will serve for both. Each consists of a pair of elongated plates 46 which, as best appears in Fig. 5, are disposed in abutment with the inner and outer sides of the wire bottom wall 47 of the basket and have bolts 48 entered through registering slots 49 that extend lengthwise of said plates and nuts 50 are threaded on the projecting lower end portions and arranged to be tightened to clamp the plates 46 in adjusted relationship to the bottom of the basket. The bolts 48 are left loose until the opposed C-shaped jaw portions 51 that are provided on the inner end portion of the plates 46 have been properly located in abutment with the top and bottom of the lower rear fork portion 16 of the bicycle frame, and the plates have been adjusted properly in a fore and aft direction relative to the bottom of the basket, and also adjusted endwise, laterally with respect to the bottom of the basket, to provide the desired spacing of the basket with respect to the bicycle frame, for the purposes previously mentioned. Then, when the bolts 48 are tightened, there is assured not only secure clamping of brackets 14 onto the bottom of the baskets 15 but also secure clamping of these brackets on the bicycle frame. The C-shape of the jaws 51, I have found, makes the brackets 14 universally applicable to different makes and models of bicycles whether the frame is of the hollow generally elliptical section indicated at 16 in Figs. 5 and 7, or the hollow circular form shown at 16' in Fig. 9, or the solid rectangular form shown at 16" in Fig. 8.

In operation, the fender-attaching bracket 19 is generally first applied to the fender 12 slightly forwardly with respect to a vertical line through the rear axle 23, and hence closer to the point of connection at 20 with the upright rear fork portion 21 of the bicycle frame. Then the frame-attaching brackets 14 are applied loosely to the bottoms of the baskets 15 so as to permit freely adjusting the same forwardly or rearwardly relative to the basket and in or out with respect to the bottom of the baskets to enable getting the baskets properly spaced from the bicycle. Then the jaws 51 on the frame-attaching brackets 14 are applied to the opposite sides of the lower rear fork 16 of the bicycle frame, and the brackets 42 (or 42') are loosely bolted onto the opposite side portions 29 of the fender-attaching bracket 19. Then all of the assembled parts are adjusted to fit properly and so that the two baskets 15 are symmetrically arranged, and finally all of the bolts are tightened. Thereafter, if the user decides to remove the baskets 15 after each use or at some particular time where the presence of the baskets 15 on the bicycle is objectionable, he can do so without too much difficulty. For example, he can loosen only the two inner bolts on each frame-attaching bracket 14 just enough to allow spreading the jaws 51 far enough apart to slip off the fork 16, and then if the bolts 40 are removed (or loosened, in the case of brackets 42') the baskets can be slipped off readily. The fender-attaching bracket 19 can be left applied to the fender without its being too noticeable, and in that way it is obvious that the two baskets 15 can be replaced later without any difficulty. On the other hand, it is also just as convenient to loosen bolts 34 as bolts 40 and in that way the bracket 19 can be left assembled on the baskets when the latter are removed from the bicycle after loosening brackets 14 enough to permit their removal from the bicycle. That procedure, it is believed, will enable reassembly of the baskets on the bicycle just as quickly as the other procedure, and, of course, it has the advantage in that it avoids the necessity for leaving any part of the assembly on the bicycle when the baskets are removed. With brackets 42', it is believed that it is best to keep the baskets assembled on bracket 19, as it reduces the likelihood of getting the baskets placed in the wrong spaced relationship to the pedals of the bicycle.

It is believed the foregoing description conveys a good understanding of the objects and advantages of my invention. The appended claims have been drawn to cover all legitimate modifications and adaptations.

I claim:

1. In a bicycle having a frame including a substantially horizontal rear fork portion, and having a rear wheel fender spaced thereabove and in rigid relationship to said fork, a pair of carrier baskets disposed in substantially parallel relationship to one another and to opposite sides of said fork, a pair of brackets horizontally disposed on opposite sides of said frame under said baskets and secured to the bottoms of the latter and having means for securing the same to opposite sides of said rear fork for fore and aft adjustment on said frame and rigid support of the baskets by their bottoms on said fork in a desired spaced relationship to the pedals of the bicycle, and an inverted generally U-shaped bracket providing downwardly extending arms on the ends of a cross-portion which extends transversely of the top of and has means for securing the same to said fender, said bracket having another means whereby the downwardly extending arms, which are disposed vertically and in abutment with the inner sides of said baskets, are rigidly but vertically adjustably secured to said baskets for their further support on the bicycle.

2. In a bicycle having a frame including a substantially horizontal rear fork portion, and having a rear wheel fender spaced thereabove and in rigid relationship to said fork, a pair of carrier baskets disposed in substantially parallel relationship to one another and to opposite sides of said fork, brackets horizontally disposed on opposite sides of said frame under said baskets and secured to the bottoms of the latter and having means for securing the same to opposite sides of said rear fork for rigid support of the baskets by their bottoms on said fork, and an inverted generally U-shaped bracket straddling said fender and having means for rigidly securing the cross-portion of the U to said fender, the arms of the U being disposed on opposite sides of said fender and having vertically elongated slots provided therein, and means connected with the upper portions of said baskets and adjustable up and down in said slots and arranged to be secured to said arms in adjusted position for further support of said baskets on said bicycle frame.

3. A bicycle structure as set forth in claim 2, wherein the fender is of arcuate cross-section and the middle portion of the cross-portion having compressible resilient bumper pads mounted on the inner side thereof arranged to rest on the opposite sides of the crown of said fender for nonmarring support of the bracket on the fender and to resist lateral displacement with respect to said fender.

4. A bicycle structure as set forth in claim 2, wherein the fender is of arcuate cross-section and the middle portion of the cross-portion formed to provide an upwardly extending portion having downwardly diverging side portions, the latter having compressible resilient bumper pads mounted on the inner side thereof arranged to rest on the opposite sides of the crown of said fender for nonmarring support of the bracket on the fender and to resist lateral displacement with respect to said fender, the means for rigidly securing said cross-portion to said fender comprising clamping elements straddling the opposite longitudinal edge portions of said fender on the bottom and having bolts fastening the same to the bottom of the cross-portion.

5. A bicycle structure as set forth in claim 2, wherein the fender is of arcuate cross-section and the middle portion of the cross-portion formed to provide an upwardly extending portion having downwardly diverging side portions, the latter having compressible resilient bumper pads mounted on the inner side thereof arranged to rest on the opposite sides of the crown of said fender for nonmarring support of the bracket on the fender and to resist lateral displacement with respect to said fender, the means for rigidly securing said cross-portion to said fender comprising clamping elements straddling the opposite longitudinal edge portions of said fender on the bottom and having bolts fastening the same to the bottom of the cross-portion, said cross-portion having its opposite end portions of increased length to space the downwardly extending arms farther away from the sides of said bicycle frame, and these end portions having longitudinally extending bolt receiving slots provided therein on a line transversely relative to said fender, whereby said last mentioned bolts fastening said clamping elements may be adjusted laterally relative to said fender to clamp the bracket onto different widths of fenders.

6. A bicycle structure as set forth in claim 2, wherein the fender is of arcuate cross-section and the middle portion of the cross-portion formed to provide an upwardly extending portion having downwardly diverging side portions, the latter having compressible resilient bumper pads mounted on the inner side thereof arranged to rest on the opposite sides of the crown of said fender for nonmarring support of the bracket on the fender and to resist lateral displacement with respect to said fender, the means for rigidly securing said cross-portion to said fender comprising clamping elements straddling the opposite longitudinal edge portions of said fender on the bottom and having bolts fastening the same to the bottom of the cross-portion, said cross-portion having its opposite end portions of increased length to space the downwardly extending arms farther away from the sides of said bicycle frame, and these end portions having longitudinally extending bolt receiving slots provided therein on a line transversely relative to said fender, whereby said last mentioned bolts fastening said clamping elements may be adjusted laterally relative to said fender to clamp the bracket onto different widths of fenders, and said clamping elements likewise being elongated in a direction transversely with respect to said fender and having longitudinally extending bolt receiving slots provided therein to permit lateral adjustment of said clamping elements relative to said bolts in clamping the bracket onto a fender.

7. A bicycle structure as set forth in claim 2, wherein the means for rigidly securing the cross-portion of the inverted U-shaped bracket to said fender comprises U-shaped clamping elements straddling the opposite longitudinal edge portions of said fender with one arm of the U engaging the underside of the fender and the other arm of the U engaging the bottom of the cross-portion of said bracket, and bolts connecting the cross-portion of said clamping elements with the cross-portion of said bracket.

8. A bicycle structure as set forth in claim 2, wherein the means for rigidly securing the cross-portion of the inverted U-shaped bracket to said fender comprises U-shaped clamping elements straddling the opposite longitudinal edge portions of said fender with one arm of the U engaging the underside of the fender and the other arm of the U engaging the bottom of the cross-portion of said bracket, and bolts connecting the cross-portion of said clamping elements with the cross-portion of said bracket, the cross-portion of said bracket having its opposite end portions of increased length to space the downwardly extending arms thereof farther away from the sides of said bicycle frame, and these end portions having longitudinally extending bolt receiving slots provided therein on a line transversely relative to said fender, whereby said last mentioned bolts may be adjusted laterally relative to said bracket and fender to enable clamping the bracket onto different widths of fenders.

9. A bicycle structure as set forth in claim 2, wherein the means for rigidly securing the cross-portion of the inverted U-shaped bracket to said fender comprises U-shaped clamping elements straddling the opposite longitudinal edge portions of said fender with one arm of the U engaging the underside of the fender and the other arm of the U engaging the bottom of the cross-portion of said bracket, and bolts connecting the cross-portion of said clamping elements with the cross-portion of said bracket, the cross-portion of said bracket having its opposite end portions of increased length to space the downwardly extending arms thereof farther away from the sides of said bicycle frame, and these end portions having longitudinally extending bolt receiving slots provided therein on a line transversely relative to said fender, whereby said last mentioned bolts may be adjusted laterally relative to said bracket and fender to enable clamping the bracket onto different widths of fenders, and said U-shaped clamping elements likewise being elongated in the cross-portion in a direction transversely with respect to said fender and having longitudinally extending bolt receiving slots provided therein to permit lateral adjustment of said U- shaped clamping elements relative to said bolts in clamping the bracket onto a fender.

10. A bicycle structure as set forth in claim 2 wherein the means for rigidly securing said cross-portion to said fender comprises clamping elements straddling the opposite longitudinal edge portions of said fender on the bottom and having bolts fastening the same to the bottom of the cross-portion.

11. A bicycle structure as set forth in claim 2 wherein the means for rigidly securing said cross-portion to said fender comprises clamping elements straddling the opposite longitudinal edge portions of said fender on the bottom and having bolts fastening the same to the bottom of the cross-portion, said cross-portion having its opposite end portions of increased length to space the downwardly extending arms farther away from the sides of said bicycle frame, and these end portions having longitudinally extending bolt receiving slots provided therein on a line transversely relative to said fender, whereby said last mentioned bolts fastening said clamping elements may be adjusted laterally relative to said fender to clamp the bracket onto different widths of fenders.

12. A bicycle structure as set forth in claim 2 wherein the means for rigidly securing said cross-portion to said fender comprises clamping elements straddling the opposite longitudinal edge portions of said fender on the bottom and having bolts fastening the same to the bottom of the cross-portion, said cross-portion having its opposite end portions of increased length to space the downwardly extending arms farther away from the sides of said bicycle frame, and these end portions having longitudinally extending bolt receiving slots provided therein on a line transversely relative to said fender, whereby said last mentioned bolts fastening said clamping elements may be adjusted laterally relative to said fender to clamp the bracket onto different widths of fenders, and said clamping elements likewise being elongated in a direction transversely with respect to said fender and having longitudinally extending bolt receiving slots provided therein to permit lateral adjustment of said clamping elements relative to said bolts in clamping the bracket onto a fender.

13. In a bicycle having a frame including a substantially horizontal rear fork portion, and having a rear wheel fender spaced thereabove and in rigid relationship to said fork, a pair of carrier baskets disposed in substantially parallel relationship to one another and to opposite sides of said fork, brackets horizontally disposed on opposite sides of said frame under said baskets and secured to the bottoms of the latter and having means for securing the same to opposite sides of said rear fork for rigid support of the baskets by their bottoms on said fork, an inverted generally U-shaped bracket straddling said fender and having means for rigidly securing the cross-portion of the U to said fender, the arms of the U being disposed on opposite sides of said fender and having vertically elongated slots provided therein, and clamp elements adjustable up and down in said slots for adjustably securing the upper portions of the baskets to said arms for further support of said baskets on said bicycle frame, said clamp elements being also adjustable on the baskets in a fore and aft direction so that the baskets may be adjusted in a fore and aft direction to a desired spaced relationship to the pedals of the bicycle.

14. In a bicycle having a frame including a substantially horizontal rear fork portion, and having a rear wheel fender spaced thereabove and in rigid relationship to said fork, a carrier basket disposed in substantially parallel relationship to said rear wheel on one side of said fork, an elongated bracket horizontally disposed under said basket on one side of said frame in substantially right angle relationship to the rear fork and having its one end portion secured to the bottom of the basket and having means on the other end for mounting the same in rigid relationship to the rear fork, and an inverted generally U-shaped bracket providing a cross-portion and downwardly extending arms on the ends thereof, said cross-portion extending transversely of the top of and having means whereby the same is secured to said rear fender, one of said downwardly extending arms being disposed alongside the inner side of the basket in substantially right angle relationship to the aforementioned horizontal bracket and having means whereby the same is rigidly but vertically adjustably secured to the inner side of said basket.

15. A bicycle structure as set forth in claim 14, wherein the fender is of generally arcuate form in cross-section, and the middle portion of the cross-portion of the U-shaped bracket overlying said fender is bent upwardly so as to define downwardly diverging side portions having bumper pads mounted thereon on the inner side thereof arranged to rest on the opposite sides of the crown of said fender for non-marring support of the U-shaped bracket on the fender and to resist lateral displacement of said bracket with respect to said fender.

16. A bicycle structure as set forth in claim 14, wherein the fender is of generally arcuate form in cross-section, and the middle portion of the cross-portion of the U-shaped bracket overlying said fender is bent upwardly so as to define downwardly diverging side portions arranged to rest on the opposite sides of the crown of said fender for support of the bracket thereon and to resist lateral displacement of said bracket with respect to said fender, the means for securing the cross-portion of said bracket to said fender comprising clamping elements straddling the opposite longitudinal edge portions of said fender on the bottom thereof and having means fastening the same to the bottom of the cross-portion of said bracket.

References Cited in the file of this patent

UNITED STATES PATENTS

| 624,669 | Moore | May 9, 1899 |
| 1,154,197 | Musselman | Sept. 21, 1915 |
| 2,704,626 | Meier | Mar. 22, 1955 |

FOREIGN PATENTS

| 448,457 | Italy | May 18, 1949 |
| 897,646 | France | May 30, 1944 |

UNITED STATES PATENT OFFICE
CERTIFICATE OF CORRECTION

Patent No. 2,890,819                        June 16, 1959

Clarence S. Glenny

It is hereby certified that error appears in the printed specification of the above numbered patent requiring correction and that the said Letters Patent should read as corrected below.

Column 5, lines 26, 35, 49, and 71, after "cross-portion", each occurrence, insert -- of the U is --; same column 5, line 26, before "having" insert -- formed to provide an upwardly extending portion having downwardly diverging side portions, the latter --.

Signed and sealed this 26th day of July 1960.

(SEAL)

Attest:
KARL H. AXLINE
Attesting Officer

ROBERT C. WATSON
Commissioner of Patents